(12) United States Patent
Tanaka et al.

(10) Patent No.: US 6,508,226 B2
(45) Date of Patent: Jan. 21, 2003

(54) COMBUSTION CHAMBER FOR DIRECT INJECTION ENGINE

(75) Inventors: Daijirou Tanaka, Iwata (JP); Shinichi Kurosawa, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/682,575

(22) Filed: Sep. 21, 2001

(65) Prior Publication Data

US 2002/0046728 A1 Apr. 25, 2002

(30) Foreign Application Priority Data

Oct. 20, 2000 (JP) ......................................... 2000-321141

(51) Int. Cl.[7] .............................................. F02B 17/00
(52) U.S. Cl. ...................... 123/295; 123/298; 123/305
(58) Field of Search .................. 123/295, 298, 123/305, 279

(56) References Cited

U.S. PATENT DOCUMENTS 5,921,215 A * 7/1999 Wirth et al. ................. 123/298
6,062,195 A   5/2000 Tanaka et al.
6,095,114 A * 8/2000 Horie et al. ................. 123/298
6,244,244 B1 * 6/2001 Fuwa et al. ................. 123/295
6,235,042 B1 * 12/2001 Grigo et al. ................. 123/302
6,366,437 B1 * 1/2002 Baika et al. ................. 123/298

FOREIGN PATENT DOCUMENTS

JP        6-81651       3/1994
JP        11-324680    11/1999

* cited by examiner

Primary Examiner—Bibhu Mohanty
(74) Attorney, Agent, or Firm—Ernest A. Beutler

(57) ABSTRACT

An improved combustion chamber configuration for a direct injected internal combustion engine. The cylinder head recess and piston head are configured so as to provide a small clearance volume and accordingly high compression ratios while the shape of the piston head and the arrangement of the cylinder head recess permits a portion of the injected fuel to be directed toward the exhaust valves to cool them and reduce smoke and increase fuel efficiency.

14 Claims, 5 Drawing Sheets

COMBUSTION CHAMBER FOR DIRECT INJECTION ENGINE

BACKGROUND OF INVENTION

This invention relates to an internal combustion engine and particularly one of the type having direct cylinder injection and more particularly to a combustion chamber for such an engine.

In the interest of improving engine performance in the field of power, fuel consumption and exhaust emission control, it has been proposed to employ direct cylinder injection. By injecting fuel directly into the combustion chamber, it is not necessary to achieve a homogeneous mixture in the combustion chamber under all running conditions so as to insure combustion. In other words, if direct cylinder injection is possible, stratification can be obtained.

One problem in connection with obtaining a stratified charge and good combustion under low speeds and low loads is the difficulty in insuring that a stoichiometric mixture is present at the spark plug at the time of ignition. Various combustion chamber arrangements have been proposed with an effort to achieve this. Many of theses combustion chamber designs employ a bowl that is formed in the head of the piston and which is configured so as to enable stratification at least under some running conditions.

For example, FIG. 1 is a prior art cross sectional view taken through the cylinder of one type of engine that has been proposed to achieve this goal. This is a combustion chamber of the type that is disclosed in Japanese Published Application Hei 6-81651, published Mar. 22, 1994In this engine, there is a combustion chamber S which is formed by a cylinder bore 11 of a cylinder block 12, a lower surface 13 of a cylinder head 14 which, in that construction, is detachably connected to the cylinder bloc k 12 and a piston 15 that reciprocates in the cylinder bore 14. In this combustion chamber S, the piston has its head portion formed with a pair of angularly inclined upper surfaces 16 and 17 which face diametrically opposed portions of the cylinder head lower surface 13 and in which respective intake 18 and exhaust passages 19 are formed. Intake and exhaust valves 21 and 22 cooperate with the valve seats formed at the ports of these intake and exhaust passages 18 and 19 to control the flow of air into the combustion chamber and exhaust gases out of the combustion chamber.

The piston head inclined portion 16 is formed with a bowl like recess 23, which is formed primarily on the intake side of the piston head but extends slightly over toward the exhaust side.

A spark plug 24 is mounted in the cylinder head 14 generally on the center of the combustion chamber S and the axis of the cylinder bore 11.

A fuel injector 25 is mounted on the intake side of the cylinder head 14 and sprays its fuel in a pattern as shown in this figure so as to impinge upon the cylinder head recess 23. The intake port or ports 18 are configured so as to cooperate with the bowl 23 to generate a tumble action as shown by the arrow "a" in this figure. The theory is that this will cause the fuel deposited in the piston head bowl 23 to be swept toward the spark plug 24 to insure stratification under low speed and low load conditions.

There are several disadvantages with this type of combustion chamber. Because of the fact that the fuel is injected on the surface of the piston head bowl 23 it tends to become excessively rich and results in lack of complete fuel evaporation into the combustion chamber S. This is because more fuel is deposited than can effectively vaporize and is liable to cause smoke generation and unwanted exhaust gas emissions.

Another solution to the problem of combustion chamber configuration and for direct injected engines is shown in Japanese Published Application Hei 11-324680, and its issued United States Letters Patent counterpart 6,062,195, issued May 16, 2000. This type of arrangement is shown in FIG. 2 and again has a combustion chamber S that is formed by a piston 31 that reciprocates in a cylinder bore 32 of a cylinder block 33. This cooperates with a combustion chamber recess formed in a cylinder head 34 that is affixed to the cylinder block 33 in a suitable manner.

Intake passages 35 open into the combustion chamber S and are valved by intake valves 36 positioned on one side of the cylinder head. On the other side of the cylinder head, exhaust passages 37 are formed which are valved by exhaust valves 38.

A fuel injector 39 is mounted between the intake valves 36 and below them and injects fuel into the combustion chamber S which is formed by the head of the piston 31, which has a slight concave configuration 41 although it is substantially flat. The fuel injector 39 sprays its fuel across this slightly concave surface 41 and propagates towards the exhaust valve 38 so as to be heated and improve fuel vaporization.

In this arrangement, there is a fairly large angle $\alpha$ between the stems of the intake and exhaust valves 36 and 38 so that the exhaust valve will be inclined to receive the fuel and also so as to preclude the fuel from passing out of the exhaust valve. Thus, this configuration causes a fairly large volume for the combustion chamber S at top dead center and makes it difficult to raise the compression ratio.

It is, therefore, a principal object to this invention to provide an improved combustion chamber configuration for a direct injected internal combustion engine.

It is a further object to this invention to provide an improved combustion chamber configuration permits the attainment of high compression ratios and avoids the likelihood of fuel condensing in the combustion chamber recess of the piston and not being able to evaporate fully before the spark plug is fired. Thus, the likelihood of smoke in the exhaust and unwanted hydrocarbons can be substantially reduced.

SUMMARY OF INVENTION

This invention is adapted to be embodied in an internal combustion chamber. The combustion chamber is defined by a cylinder bore closed at one end by a cylinder head combustion chamber surface and at the other end by a piston reciprocating in the cylinder bore. The cylinder head combustion chamber surface has a pair of angular related surface portions formed on diametrically opposed sides thereof. At least one intake port is formed in one of the cylinder head combustion chamber angularly related surface portions. At least one exhaust port is formed in the other of the cylinder head combustion chamber angularly related surface portions. The piston has a head portion with an upper combustion chamber surface. The piston head portion includes an inclined surface facing the one of the cylinder head combustion chamber surface portions and which is inclined toward the other of the cylinder head combustion chamber angularly related surface portions. A fuel injector is mounted in the engine on the side of the combustion chamber formed by the one of the cylinder head combustion chamber angularly related surface portions and sprays toward the piston head portion inclined surface such that at least a part of the fuel injected therefrom will be directed toward the exhaust port.

DETAILED DESCRIPTION

Figure 3:
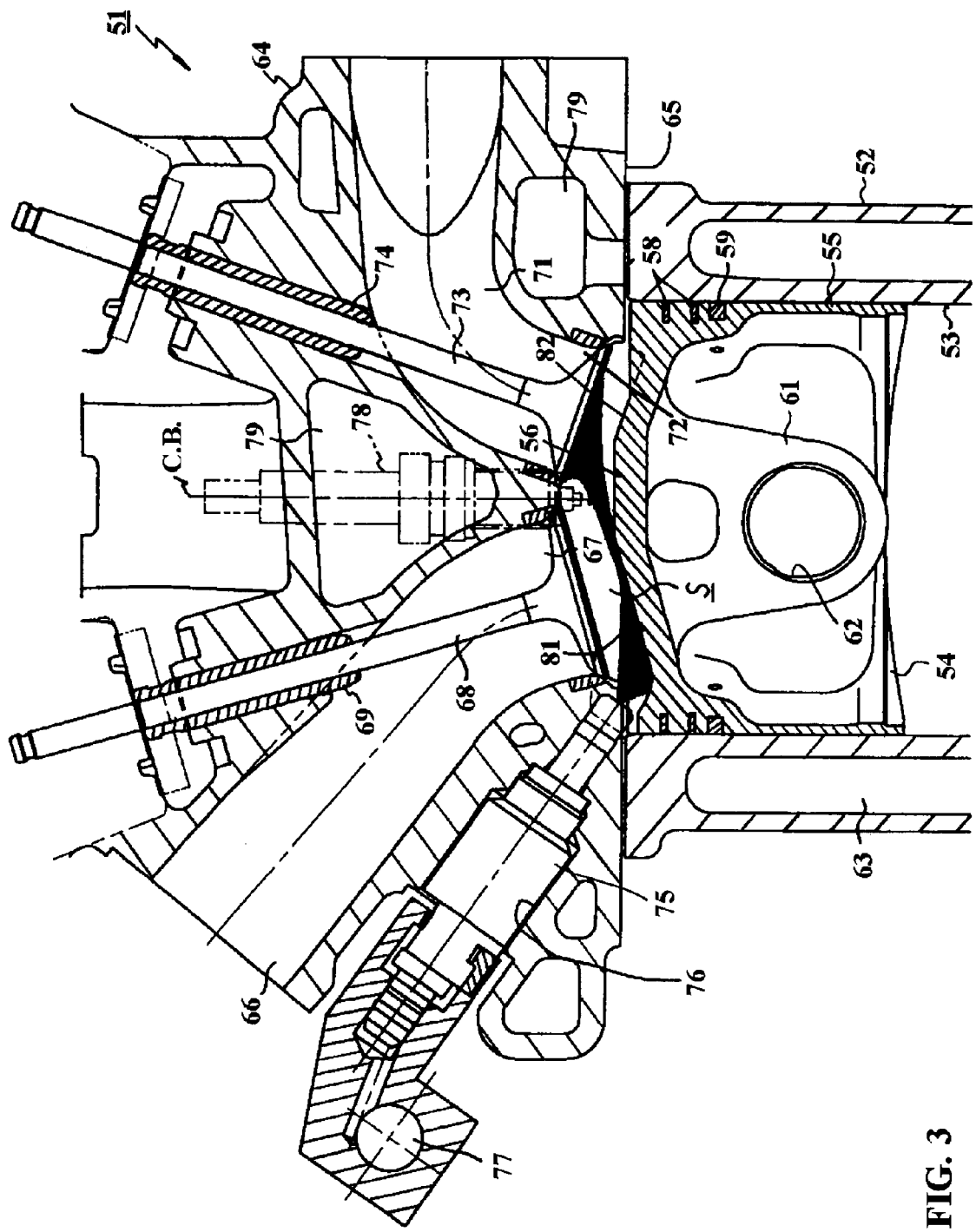
FIG. 3 is a more detailed cross sectional view, in part similar to FIGS. 1 and 2, but showing the construction associated with one cylinder of the instant invention.
Figure 4:
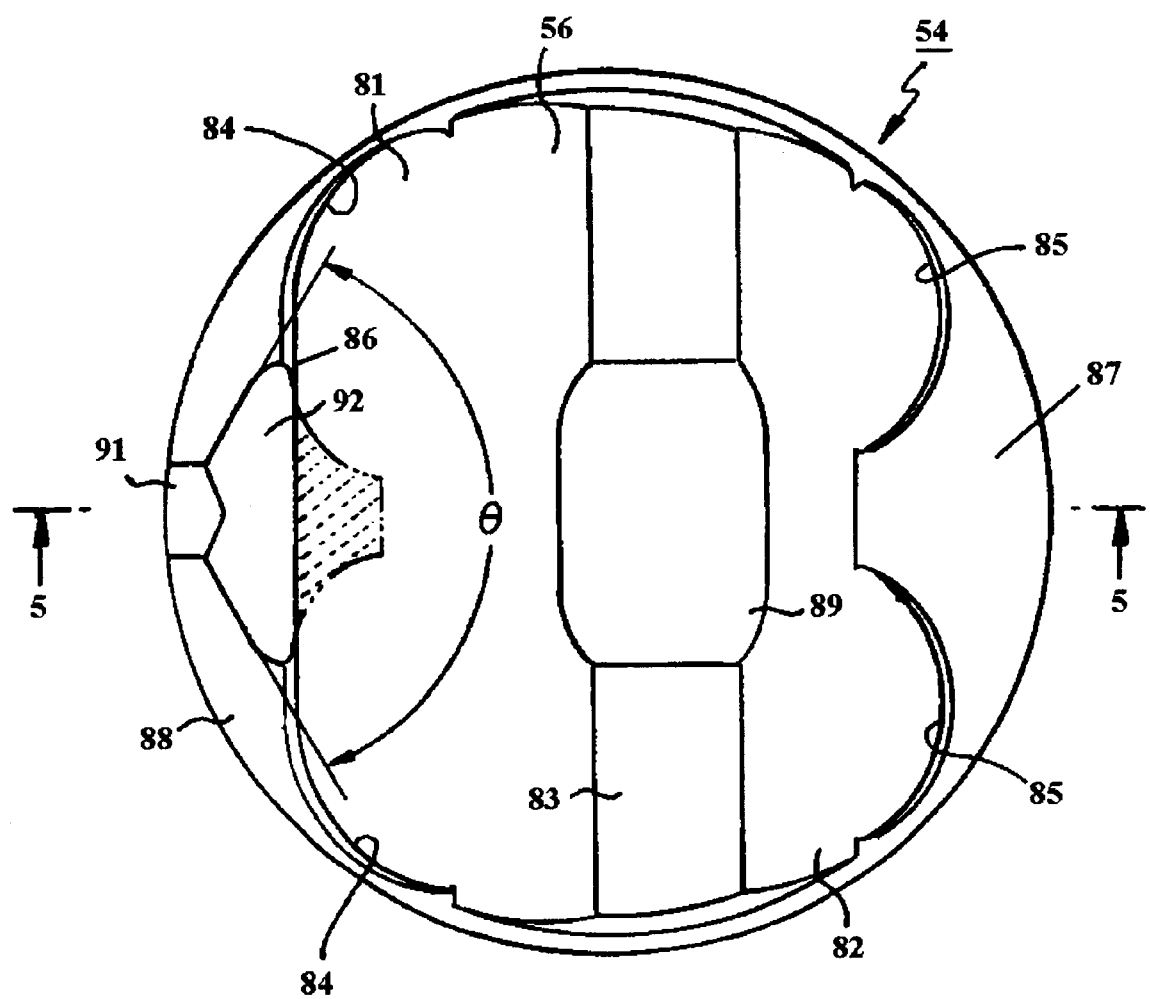
FIG. 4 is a top plan view of the piston head.
Figure 5:
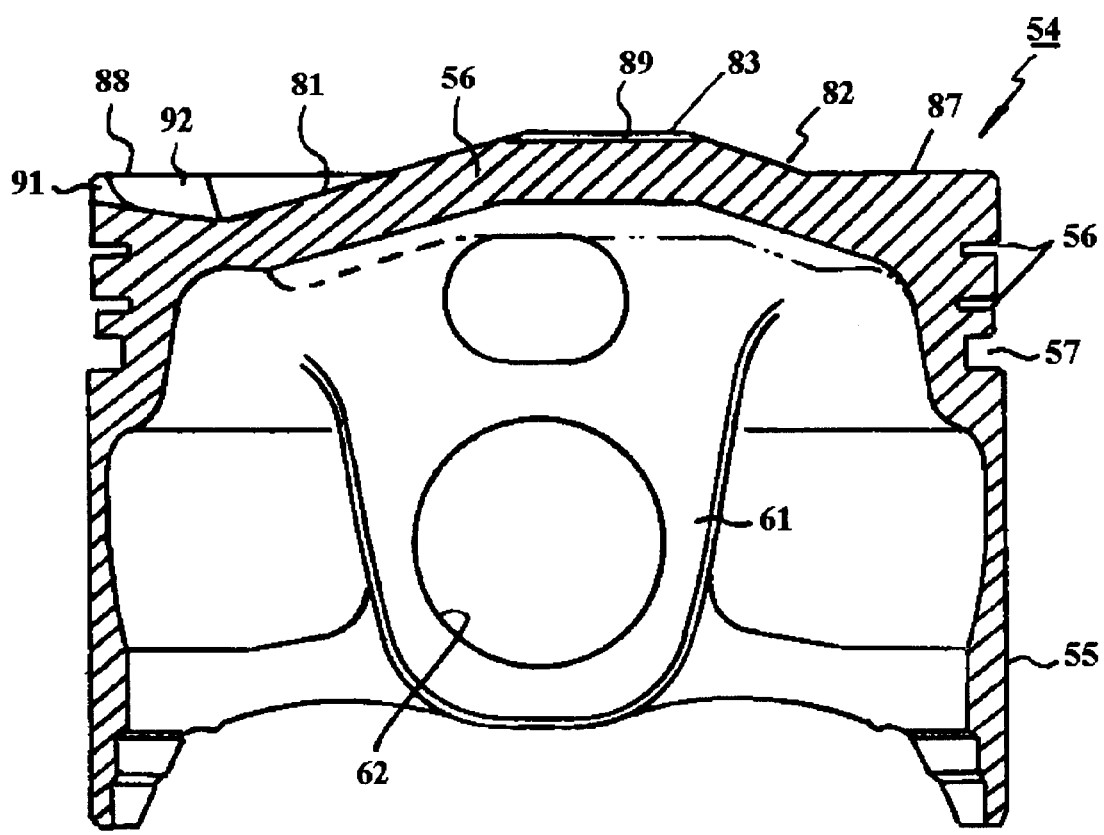
FIG. 5 is a cross sectional view taken along the line 5—5 of FIG. 4.

Referring now in detail to the drawings and particularly FIGS. 3 through 5, but initially primarily to FIG. 3, an internal combustion engine constructed in accordance with an embodiment of the invention is identified generally by the reference numeral 51. The entire engine 51 is not depicted because the invention deals, as afore described, with the combustion chamber thereof, indicated by the reference character S. Also, only a single cylinder of the engine is depicted because it is believed readily apparent to those skilled in the art how the invention can be practiced with engines having any desired number of cylinders and any cylinder configuration such as in line, V-type or opposed.

The engine 51 has a cylinder block 52, only the upper end of which is shown. This cylinder block 52 defines a cylinder bore 53 in which a piston 54 is supported for reciprocation. The axis of the cylinder bore is indicated as "C.B". The piston 54 has a skirt portion 55 that faces the cylinder bore 53 and which terminates at its upper end in a head portion 56. The head portion 56 has a plurality of ring grooves 56 and 57 in which piston rings 58 and 59 are received for providing compression and oil sealing purposes.

The piston 54 further has a pair of bosses 61 on the inner portion thereof that have piston pin receiving openings 62 to receive a piston pin for connection to the small end of a connecting rod, the big end of which is journalled on the crankshaft. None of these latter elements are illustrated in the figure for the reasons aforenoted.

The cylinder block 52 is also formed with a cooling jacket 63 which surrounds its cylinder bores 53 and through which coolant is circulated in a suitable manner.

Affixed to the cylinder block 52 in a suitable manner, which may include integral formation, is a cylinder head member 64. The cylinder member 64 has a first surface 65 which is in sealing engagement with the cylinder block 52 around its cylinder bores 53. A recessed surface area is formed therein over the piston 54 having a configuration, which will be described shortly for completing the formation of the combustion chamber S.

On one side of a diametrical plane passing through the axis C.B. of the cylinder bore 53 there are formed a pair of intake passages 66 which terminate at intake ports 67 that lie in a first angularly inclined surface of the combustion chamber recess formed therein. Intake valves 68 cooperate with valve seats formed at the intake ports 67 so as to control the admission of an intake air charge into the combustion chamber S. These intake valves 68 have their stem portions slidably supported in valve guides 69 formed in the cylinder head 64. These intake valves 68 are opened by any suitable form of valve actuating mechanisms and are closed by suitable return springs, the construction of which valve operation may be of any suitable type.

On the opposite side of the aforementioned diametrical plane, there are formed a pair of exhaust passages 71 which terminate in exhaust ports 72. These exhaust ports 72 lie in a second inclined surface of the cylinder head combustion chamber surfaces and these two cylinder head inclined surfaces generally merge along the diametrical plane that contains the cylinder bore axis C.B.

The flow through the valve seats formed at the exhaust ports is controlled by exhaust valves 73 which, like the intake valves, are slidably supported in valve guides 74 fixed in the cylinder head 64. As with the intake valve 68, the exhaust valve 73 may be operated any suitable type of operating mechanism.

The angle between the reciprocal axes of the intake valves 68 and the exhaust valves 73 may be kept fairly shallow so that the compression ratio can be maintained high. Also, this permits the formation of a more compact cylinder head assembly and leaves a greater amount of room for a fuel injector 75 that is mounted in an injector pocket 76 formed on the intake side of the cylinder head 64. Fuel is supplied to the fuel injector 75 through a fuel rail 77 in a well known manner.

Spark plugs 78 are mounted in the cylinder head 64 generally on the cylinder bore axis C.B. which is substantially the center of the combustion chamber S.

A cooling jacket arrangement indicated by the reference numeral 79 is formed in the cylinder head 64 and communicates with the cylinder block cooling jacket 63 in an appropriate manner for cooling the cylinder head 64.

The fuel injector 75 has its spray axis directly downwardly toward the piston head 56 in a manner, which will now be described in more detail by particular reference to FIGS. 4 and 5 in addition to FIG. 3. As seen in these figures, the piston head 56 is formed by a pair of angularly related portions 81 and 82 formed on the intake and exhaust sides thereof, respectively. It will be seen that the inclined portions 81 and 82 do not actually intersect each other, but rather intersect a generally planar surface 83 formed centrally of the piston head 56. Partially because the diameter of the exhaust ports 72 is smaller than that of the intake ports 67, the surface 83 is somewhat offset toward the exhaust side so that the inclined surface 81 has a longer range than the exhaust side surface 82.

The surfaces 81 and 82 are disposed to be substantially parallel to the surfaces in which the intake ports 67 and exhaust ports 72 of the cylinder head 64 are formed. Both of these inclined surfaces 81 and 82 are bounded by curved cutouts 84 and 85 to clear the intake and exhaust valves 68 and 73, respectively. the curved portions 84 on the intake side are joined by a tangential wall 86.

On the other hand, on the exhaust side the curved portions 84 extend inwardly toward the flat surface 83 so as to assist in increasing the compression ratio. No such corresponding portion is formed on the intake side as seen by the shaded area in FIG. 4.

This leaves a squish area 87 on the exhaust side periphery and a somewhat smaller squish area 88 on the intake side periphery of the piston head 56.

The central part of the flattened area 83 at the top of the piston head is formed with a recess 89 so as to provide clearance for the spark plug 78 and specifically the gap thereof at top dead center.

On the intake side and specifically in the area below the tip of the fuel injector 75 the squish area 88 is provided with a clearance groove 91 of somewhat short radial extent that intersects a further fan-shape relieved area 92 so as to permit the fuel sprayed from the injector 75 to impact on the piston head surface portion 81 and spread while confining it from impinging on the outer periphery of the piston head 56. The angle ⊖ of this fan-shaped area 92 is preferably in the range of 120° but this angle will depend upon the injection spray pattern of the injector nozzle.

As may be best seen in FIG. 3, the fuel is sprayed from the injector 75 and flows downwardly toward the piston inclined surface 81. This surface 81 will direct the sprayed fuel in the manner shown in the shaded patch in FIG. 3 toward the head of the exhaust valves 74 so as to improve vaporization. This prevents the generation of smoke.

Figure 1:
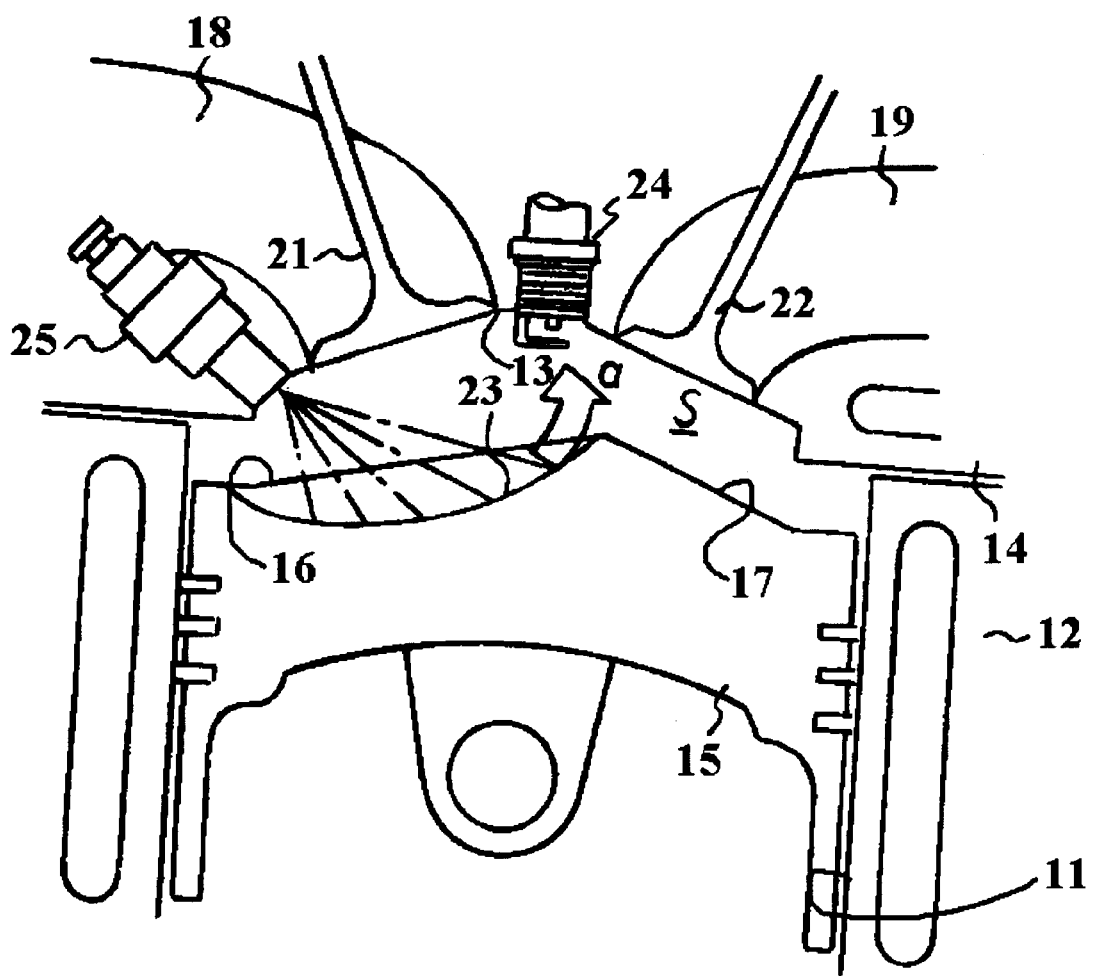
FIG. 1 is a cross sectional view taken through the combustion chamber of one cylinder of an engine constructed in accordance with a first form of prior art construction.
Figure 2:
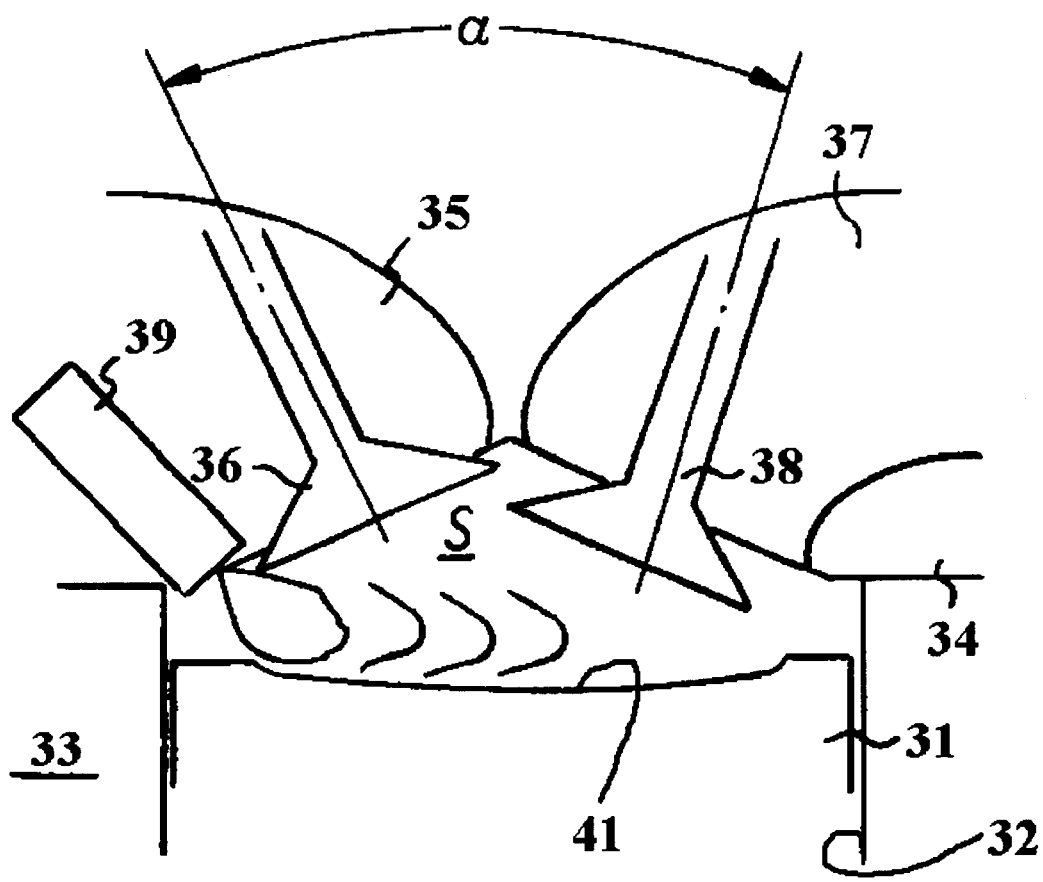
FIG. 2 is a cross sectional view, in part similar to FIG. 1, and shows another prior art combustion chamber configuration.

FIG. 1 shows the condition at top dead center when running at an engine speed of 7200 rpm. Fuel is injected from the end of the exhaust stroke to the later half of the intake stroke at crank angles ranging from 380° before top dead center to 250° before top dead center at this engine speed. In addition to improving the fuel vaporization, the fuel impingement on the exhaust valves 73 aids in their cooling and also the intake side of the piston head 56 is cooled by this fuel impingement so as to increase the knocking limit.

Thus, from the foregoing description it should be readily apparent that the described embodiment of the invention permits the use of high compression ratios with direct injected engines and also avoids the likelihood of smoke generation as well as improving temperature control within the combustion chamber. Of course, the foregoing description is that of a preferred embodiment of the invention and various changes and modifications may be made without departing from the spirit and scope of the invention, as defined by the appended claims.

What is claimed is:

1. An internal combustion engine combustion chamber defined by a cylinder bore closed at one end by a cylinder head combustion chamber surface and at the other end by a piston reciprocating in said cylinder bore, said cylinder head combustion chamber surface having a pair of angularly related surface portions formed on diametrically opposite sides thereof, at least one intake port formed in one of said cylinder head combustion chamber angularly related surface portions, at least one exhaust port formed in the other of said cylinder head combustion chamber angularly related surface portions, said piston having a head portion with an upper combustion chamber surface, said piston head portion including an inclined planar surface facing said one cylinder head combustion chamber angularly related surface portions and inclined toward said other of said cylinder head combustion chamber angularly related surface portions, and a fuel injector mounted in said engine on the side of said combustion chamber formed by said one of said cylinder head combustion chamber angularly related surface portions and spraying toward said piston head portion inclined planar surface, said piston head portion inclined planar surface being offset from the cylinder bore axis toward said fuel injector such that at least a part of the fuel injected therefrom will be directed toward said exhaust port.

2. An internal combustion engine combustion chamber as set forth in claim 1 wherein there are a plurality of intake ports formed in the one of the cylinder head combustion chamber angularly related surface portion, said intake ports being valved by poppet valves and said piston head inclined surface being formed with recesses formed to provide clearances for at least two of said poppet valves.

3. An internal combustion engine combustion chamber as set forth in claim 1 wherein a second planar inclined surface facing the other cylinder head combustion chamber angularly related surface portions is formed on the piston head diametrically opposite the first mentioned piston head inclined surface.

4. An internal combustion engine combustion chamber as set forth in claim 3 wherein the piston head inclined surfaces converge toward the cylinder bore axis where they are joined by a generally flat piston head surface.

5. An internal combustion engine combustion chamber as set forth in claim 4 wherein the generally flat piston head surface is displaced from the axis of the cylinder bore toward the exhaust port so the first piston head inclined surface lies closer to said cylinder bore axis than the second piston head inclined surface.

6. An internal combustion engine combustion chamber as set forth in claim 5 wherein there are a plurality of intake ports formed in the one of the cylinder head combustion chamber angularly related surface portion, said piston head inclined surface being formed with recesses formed to provide clearances for at least two of said poppet valves.

7. An internal combustion engine combustion chamber as set forth in claim 6 wherein the piston head inclined surface recesses comprise a pair of circular portions joined by a straight, tangential wall, said straight, tangential wall lying parallel to and spaced away from the axis of the cylinder bore.

8. An internal combustion engine combustion chamber as set forth in claim 7 wherein a squish area surrounds the one cylinder head combustion chamber angularly related surface portion recesses.

9. An internal combustion engine combustion chamber as set forth in claim 8 wherein a groove is formed in the squish area to clear the fuel injector.

10. An internal combustion engine combustion chamber as set forth in claim 9 wherein a fan shaped recess extends through the squish area from the groove for directing the fuel injected by the fuel injector at least in part on the piston head inclined surface.

11. An internal combustion engine combustion chamber defined by a cylinder bore closed at one end by a cylinder head combustion chamber surface and at the other end by a piston reciprocating in said cylinder bore, said cylinder head combustion chamber surface having a pair of angularly related surface portions formed on diametrically opposite sides thereof, a plurality of intake ports formed in one of said cylinder head combustion chamber angularly related surface portions, said intake ports being valved by poppet valves, at least one exhaust port formed in the other of said cylinder head combustion chamber angularly related surface portions, said piston having a head portion with an upper combustion chamber surface, said piston head portion including an inclined surface facing said one cylinder head combustion chamber angularly related surface portions and inclined toward said other of said cylinder head combustion chamber angularly related surface portions, a fuel injector mounted in said engine on the side of said combustion chamber formed by said one of said cylinder head combustion chamber angularly related surface portions and spraying toward said piston head portion inclined surface such that at least a part of the fuel injected therefrom will be directed toward said exhaust port, said piston head inclined surface being formed with recesses formed to provide clearances for at least two of said poppet valves, said piston head inclined surface recesses comprising a pair of circular portions joined by a straight, tangential wall, said straight, tangential wall lying parallel to and spaced away from the axis of the cylinder bore.

12. An internal combustion engine combustion chamber as set forth in claim 11 wherein a squish area surrounds the piston head inclined surface recesses.

13. An internal combustion engine combustion chamber as set forth in claim 12 wherein a groove is formed in the squish area to clear the fuel injector.

14. An internal combustion engine combustion chamber as set forth in claim 13 wherein a fan shaped recess extends through the squish area from the groove for directing the fuel injected by the fuel injector at least in part on the piston head inclined surface.

* * * * *